United States Patent [19]
van de Graaf et al.

[11] Patent Number: 5,509,950
[45] Date of Patent: Apr. 23, 1996

[54] FILTER DEVICE FOR THE FILTRATION OF GASES AND/OR FLUIDS

[75] Inventors: Peter van de Graaf, Den Bosch; Jos Valkenburg, Rotterdam, both of Netherlands

[73] Assignee: Minnesota Mining and Manufacturing Company, St. Paul, Minn.

[21] Appl. No.: 347,370

[22] PCT Filed: May 28, 1993

[86] PCT No.: PCT/US93/05140

§ 371 Date: Dec. 2, 1994

§ 102(e) Date: Dec. 2, 1994

[87] PCT Pub. No.: WO94/01200

PCT Pub. Date: Jan. 20, 1994

[30] Foreign Application Priority Data

Jul. 11, 1992 [DE] Germany .............................. 9209362 U

[51] Int. Cl.⁶ .................................................. B01D 46/00
[52] U.S. Cl. ................... 55/486; 55/497; 55/500; 55/502; 55/522
[58] Field of Search .................................. 55/385.2, 486, 55/497, 499, 500, 385.3, 502, 521, 522

[56] References Cited

U.S. PATENT DOCUMENTS

| | | | |
|---|---|---|---|
| 2,415,579 | 2/1947 | Dahlman | 55/499 |
| 3,246,457 | 4/1966 | Baun | 55/499 |
| 3,712,033 | 1/1973 | Gronholz | 55/497 |
| 3,793,813 | 2/1974 | McAllister | 55/499 |
| 4,439,219 | 3/1984 | Lambrecht | 55/499 |
| 5,047,075 | 9/1991 | Lin | 55/486 |
| 5,288,300 | 2/1994 | Muller et al. | 55/497 |

FOREIGN PATENT DOCUMENTS

| | | | |
|---|---|---|---|
| 0450299 | 2/1991 | European Pat. Off. . | |
| 0490169 | 6/1992 | European Pat. Off. . | |
| 1776236 | 10/1974 | Germany | 55/497 |
| 3439255 | 4/1986 | Germany . | |
| 4-45814 | 2/1992 | Japan | 55/497 |
| 1485072 | 9/1977 | United Kingdom . | |
| 1570385 | 7/1980 | United Kingdom . | |
| 2179872 | 3/1987 | United Kingdom | 55/497 |

*Primary Examiner*—C. Scott Bushey
*Attorney, Agent, or Firm*—Gary L. Griswold; Walter N. Kirn; William J. Bond

[57] ABSTRACT

The filter device (10) has a filter element (12) including a filter medium (20) arranged in zig-zag shaped pleats. On its two longitudinal sides extending in the pleating direction (36), the filter medium (20) is provided with stabilizing strips (34) bonded thereto for stabilizing the zig-zag-shaped pleated configuration of the filter medium (20). During use of the filter device (10), the filter element (12) is arranged within a filter element holding frame (14) which is inserted in a holding members, e.g. in the air inlet shaft (18) of an air conditioning system. Due to a certain inherent stability of shape of the filter medium (20) and the stabilizing strips (34), the filter element (12) is sufficiently firm and has a self-supporting construction. The filter element (12) is easy to handle and can be inserted into the filter element holding frame (14) in a simple manner. Except for the actual filter medium (20), the filter element (12) requires little extra material, i.e., for the stabilizing strips (34), in order to ensure stability of the device. Thus, when replacing the filter element (12), the quantity of waste material to be disposed of in addition to the filter medium (20) is extremely small.

13 Claims, 2 Drawing Sheets

FILTER DEVICE FOR THE FILTRATION OF GASES AND/OR FLUIDS

The invention is directed to a filter device for the filtration of gases and/or fluids, and particularly for the filtration of air streaming into the passenger cabin of a motor vehicle.

BACKGROUND AND FIELD OF THE INVENTION

Filter devices for the above uses are known in a large variety of types. For enlarging the volume of the filter medium having the gas or the fluid passing there-through for cleaning, a known approach has been to arrange the filter medium in zig-zag pleats. Thus, in a large number of known filter devices, the filter element comprising the filter medium has a pleated configuration which is exposed to the flow to be cleaned. In most cases, the filter elements are enclosed by a filter element holding frame for stabilization.

Filter devices of the above type are known, e.g., from U.S. Pat. No. 3,246,457, GB-PS 1 570 385 and EP-A-0 450 299. A common disadvantage of these known filter devices resides in that the exchangeable part of the filter device encloses the filter element and the holding frame of the filter element. However, these two components of known filter devices consist of different materials, thus complicating any environmentally friendly disposal of the disposable parts of known filter devices. Further, the quantity of waste or disposable material is considerable because the stabilization of the pleated structure of the filter medium of the filter element necessitates relatively large quantities of material which, when exchanging the filter medium, have to be exchanged as well and thus have to be disposed of.

It to an object of the invention to provide a filter device for the filtration of gases and/or fluids, and particularly a filter device for the filtration of air streaming into the passenger cabin of a motor vehicle, wherein the quantity of material which is not used for the cleaning of games and/or fluids, but which must be disposed nonetheless when replacing a spent filter medium, is as small as possible.

For solving the above object, the invention proposes a filter device of the above type comprising the following features:

A filter element including a filter medium pleated in zig-zag manner and being provided, on its two longitudinal sides extending in the pleating direction, with stabilizing strips for stabilizing the zig-zag-shaped pleated configuration of the filter medium, with said stabilizing strips being directly bonded to the longitudinal edges of the filter medium, a sealing medium provided on the outer sides of the two stabilizing strips which are facing away from the filter medium, and a filter element holding frame having longitudinal and transverse portions and being adapted for insertion of the filter element thereinto and for removal of the filter element therefrom, wherein, when the filter element in inserted in the filter element holding frame, the sealing material of the stabilizing strips is in abutment with the inner sides of said longitudinal frame portions of the filter element holding frame and end portions of the filter medium in the pleating direction are engaged with receiving means provided on said transverse portions of the filter element holding frame.

In the filter means of the invention, the stabilization of the pleated configuration of the filter medium is effected—irrespective of a certain inherent stability of shape of the filter medium in its pleated state only by two stabilizing strips. These stabilizing strips are bonded to the longitudinal edges of the filter medium which ends extend in the pleating direction. The thickness of said stabilizing strips, while being dependent an the material selected for the stabilizing strips, need only be selected in such a manner that the filter medium is given a consistent or regular mechanically stable pleated configuration. Such stabilizing strips or similar suitable measures are not provided on the and portions of the filter medium in the pleating direction. The width of the stabilizing strips along the longitudinal edges of the filter medium corresponds to the height of the pleated structure.

Handling of the filter element of the filter device of the invention in easy and convenient. In order to replace a filter element with its spent filter medium by a now one, the old filter element is taken out of the filter element holding frame and a new filter element in inserted into the holding frame. When the filter element is in its final position in the holding frame, the sealing medium of the two stabilizing strips are in abutment with the inner sides of the longitudinal frame portions of the holding frame. When using the filter device, gases and fluids are prevented by this sealing medium from passing through the space between the filter element and the filter element holding frame without being filtered. At the end portions of the filter medium in the pleating direction, the occurrence of any open air gap extending in the plane of the cross section of the filter element holding frame is precluded by insertion of the end portions into receiving means formed on the transverse portions of the frame. The end portions are inserted into the receiving means at the same time the filter element is inserted into the frame. Preferably, the receiving means are provided as gap-like recesses having their openings directed against the flow direction. These recesses accommodate the full end portions of the filter medium and are arranged in the flow direction. This construction offers the advantage that, on the one hand, insertion of the filter element into the filter element holding frame is simplified and, on the other hand, during use of the filter device, the gas or fluid to be cleaned presses the end portions of the filter medium into the receiving means, so that the filter medium end portions are reliably protected from slipping out of the receiving means during use of the filter device.

In the filter device of the invention, the filter element, i.e. the filter medium with the two stabilizing strips bonded thereto, is the only component which has to be exchanged at the end of the life span of the filter medium. The filter element holding frame, which in preferably placed into a holding means for the filter device, e.g., into the air intake opening of an air condition system, and particularly in a manner allowing exchange of the frame, can be reused. Thus, the quantity of waste material to be disposed in minimized because a very small quantity of material is required for producing the stabilizing strip and the sealing medium.

Preferably, the filter medium, the sealing medium, the strips of stabilizing material and the adhesive agent for connecting the filter medium and the sealing medium to the stabilizing strip will comprise the same plastic material; this plastic material is preferably polypropylene. Thus, disposal and potential reuse of the filter element material is less complicated than with prior art devices since the filter element of the invention is not made from materials which are different from each other. In this regard, the filter device of the invention is environmentally friendly.

In an advantageous embodiment of the invention, it is provided that the filter element holding frame has inclined or at least partially inclined frame portions for facilitating insertion of the filter element. By a filter element holding frame of this form, conically tapering in the direction of insertion of the filter element, handling of the entire device is made still easier.

In an advantageous embodiment of the invention, the receiving means are provided as recessed inserting spaces being delimited, on the one hand, by the frame cross sections of the filter element holding frame and, on the other hand, by flaps or tongues arranged on these cross sections. Said flaps are arranged on the cross sections of the frame and/or on the longitudinal portions of the frame in the region of the ends facing the cross sections of the frame. The two flaps are oriented at a slight inclination toward each other or comprise portions extending at an inclination toward each other so that the space between a flap and the cross section of the frame becomes larger in the upward direction. The flaps can be integrally connected to the filter frame; it will suffice if the flaps extend only over part of the length of the cross sections of the frame, while being arranged, e.g., at a central position with respect to the longitudinal axis of the filter element holding frame. Preferably, the flaps, arranged within the filter element holding frame, engage from below the end portions of the zig-zag shaped filter medium, or at least partially do so. However, the flaps preferably extend across the full cross section of the filter end portions on the downstream or lower edge to prevent passage of air or fluid. The flaps can taper from the upward or upstream edge to the lower or downstream edge to facilitate insertion. Thus, the flaps support the filter medium on the ends of the filter medium in the pleating direction, which contributes to the stabilization of the zig-zag configuration of the filter element.

Preferably, the end portions of the filter element are adapted to be pressed into the receiving means; the distance between the cross section of the frame and the flap is—at least in certain areas (e.g., the downstream edge)—less than the thickness of the filter medium so that the end portions of the filter medium inserted in the receiving means are (slightly) compressed.

Preferably, the sealing medium comprises a material which also fulfills a filtering function. The material of the sealing medium advantageously corresponds to that of the filter medium so that the gases and fluids entering the space between the stabilizing strips of the filter element and the longitudinal frame portions of the filter element holding frame are filtered as well. The sealing medium is suitably a one- or multi-layered non-woven filter which can be used also as a material for the filter medium while being supported by a reticular support structure. Particularly, the sealing medium is provided as a narrow strip whose width in smaller than that of the stabilizing strip to which it is bonded, and which extends over the entire length of the stabilizing strip preferably on the downstream or lower edge. Thus, the sealing medium does not cover the entire outer side of a stabilizing strip, which contributes to economical use of material. Further, insertion of the filter element into the filter element holding frame in facilitated.

BRIEF DESCRIPTION OF THE DRAWINGS

An embodiment of the invention will be described in greater detail hereunder with reference to the drawings.

DESCRIPTION OF THE PREFERRED EMBODIMENTS

Figure 1:
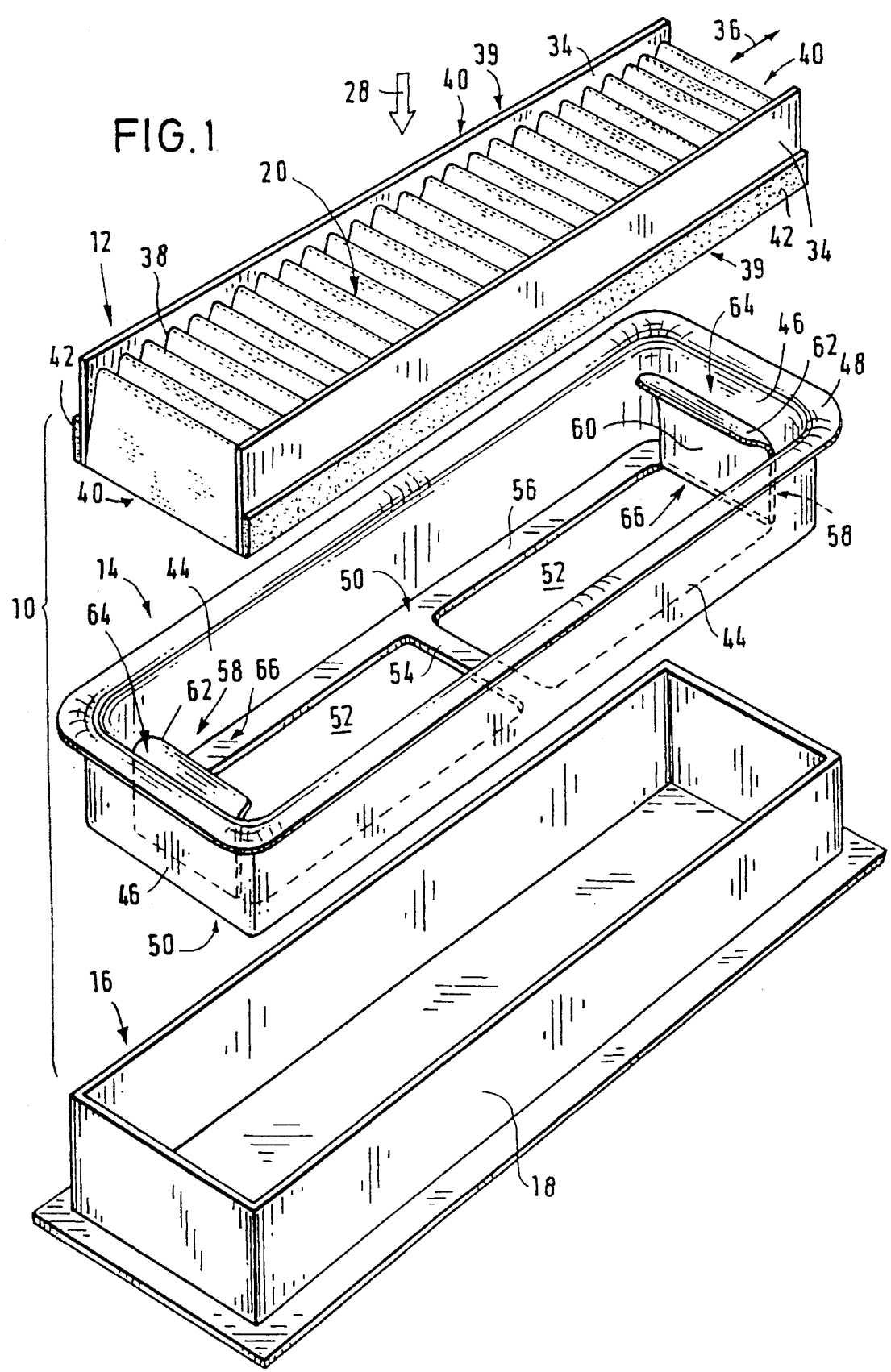
FIG. 1 is an exploded view of a filter device with a filter element, a filter element holding frame for receiving the filter element, and a holding means for insertion of the filter element holding frame.

FIG. 1 shows, in an exploded view, a filter device 10 for filtration of the air streaming into the passenger cabin of a motor vehicle. This air stream is maintained by a device provided for this purpose, e.g. a blower or the like adapted for blowing or sucking air through the filter element. The term "means" has a very wide meaning in the context of the invention; it is meant to comprise all devices and circumstances providing for a (fluid) flow passing through the filter element. Ultimately, in a vehicle provided with the above filter element 10, such a means can also be the vehicle itself because the vehicle generates an airflow while being driven, with the airflow streaming through the filter element of the filter means.

Figure 2:
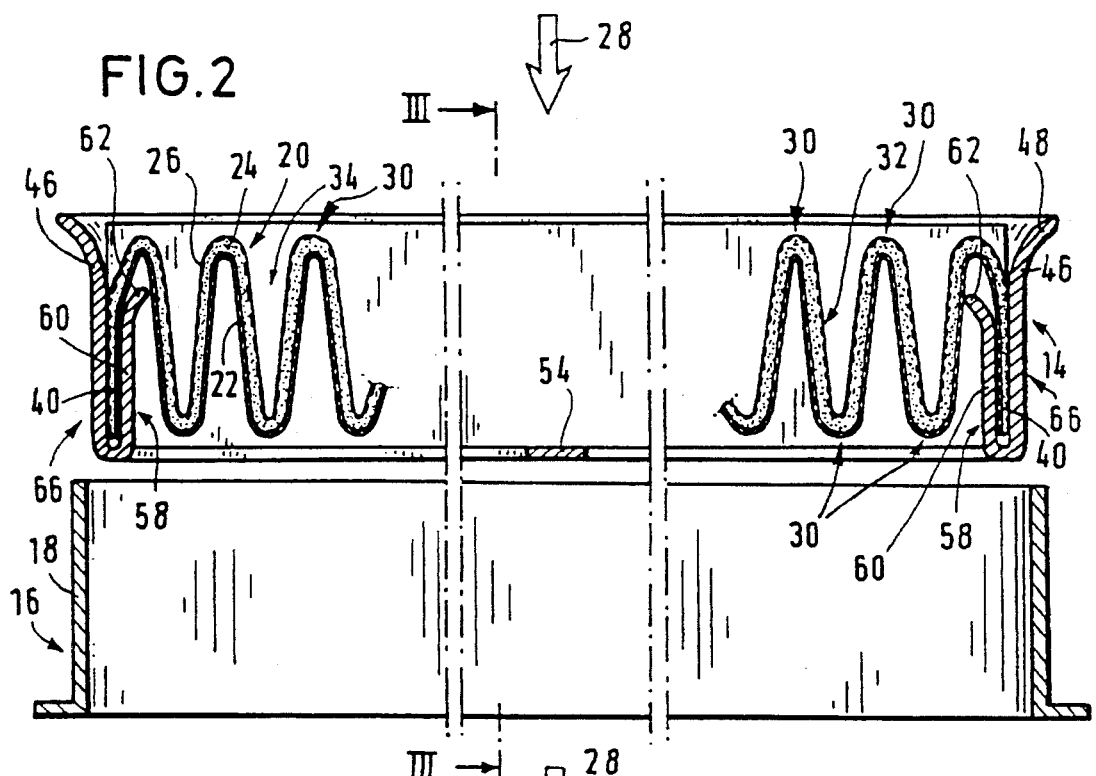
FIG. 2 is a longitudinal sectional view of the filter device according to FIG. 1, showing the filter element inserted into the holding frame.

The filter device 10 comprises a filter element 12 which can be inserted into a filter element holding frame 14 and, for replacing the filter element 12, can be taken out therefrom. The filter element holding frame 14 is placed in a holding means 16 for the filter element holding frame 14 which in the present case is provided as an air inlet shaft 18. Filter element 12 comprises a zig-zag shaped pleated filter medium 20 which, as best shown in FIG. 2, is provided as a reticular support structure 22 with a relatively loose first non-woven filter layer 24 arranged thereon; said non-woven filter layer 24 in turn has arranged thereon a relatively firm second non-woven filter layer 26 as a cover layer. This structure of combined materials forming the filter medium 20 is arranged in zig-zag pleats which is particularly evident from FIGS. 1 and 2. This zig-zag configuration is determined—when viewed in the direction of the air flow 28—by laterally and transversely spaced successive bending portions 30 having substantially plane pleating portions 32 arranged therebetween. In its zig-zag-shaped pleated configuration, filter medium 20 has a certain stability which is further enhanced by two stabilizing strips 34. These stabilizing strips 34 are relatively thin and are bonded to the longitudinal edges 38 of filter medium 20 extending in the pleating direction (twin arrow 36). Thus, the two stabilizing strips 34 are arranged on the two longitudinal sides 39 of filter medium 20 while the filter medium 20 is not provided with such a reinforcement on its two transverse sides, i.e., on its end portions 40 in the pleating direction 36. Instead, filter medium 20 has its end portions 40 terminated by a respective pleating portion 32 which, when filter element 12 is in the correct orientation for insertion into filter element holding frame 14, is facing toward the filter element holding frame 14.

Narrow strips of a sealing material 42 are bonded to the outer sides of the stabilizing strips 34. The material of the sealing medium 42 in a non-woven layer which, like the first non-woven filter layer 24 of filter medium 20, holds a cover layer (not shown). Thus, the combined layered filter structure of the non-wovens used for the filter medium 20, is also suitable as the material for the sealing medium 42. The purpose of the sealing medium 42 on the outer sides of stabilizing strips 34 resides in providing a closure at least resistant to air flow in the space of the gap between stabilizing strips 34 and filter element holding frame 14, which gap is generated upon insertion of filter element 12 into holding frame 14; in this manner any air flow sweeping along the sides of filter element 12 also undergoes filtration.

The complete filter element 12 consists of one and the same plastic material, in this case of polypropylene. Also the fibers for the various non-woven layers of filter medium 20 and sealing medium 42 consist of polypropylene. Preferably, the polypropylene is not dyed or, in as far as it is dyed, is kept the same color for all of the components of the filter element (sealing medium 42, stabilizing strips 34, filter medium 20).

The thickness of stabilizing strips 34 is selected in such a manner that the amount of material used is as little as is required for the stabilizing strips 34 to safeguard a sufficiently consistent, self-supporting, mechanically stable pleated configuration for filter element 12. Preferably, the stabilizing strips 34 of polypropylene have a thickness of only 0.2 to 0.5 mm. It has been revealed that even a thickness of stabilizing strips 34 of about 0.2 to 0.3 mm may be sufficient.

The filter element holding frame 14 which receives the filter element 12 comprises two parallel longitudinal frame portions 44 and two parallel transverse frame portions 46 connecting the longitudinal frame portions 44. The longitudinal and the transverse portions 44, 46 of the frame enclose filter element 12 on all four sides over the entire height thereof (extension of filter element 12 in flow direction 28). Filter element holding frame 14 is provided on one end with a continuous peripheral flange-like edge 48 bent in outward direction. Further, filter element holding frame 14 comprises a bottom 50 on the end opposite edge 48. Bottom 50 has two cutout portions 52 formed therein, with a web 54 being provided between said cutout portions 52 and a bottom edge portion 56 surrounding both of the cutout portions 52. On two edges of the bottom edge portions 56 facing away from each other in the longitudinal direction of the filter element holding frame 14, upright flaps or tongues 58 are arranged. These flaps 58 have a width corresponding to the width of the two substantially rectangular cutout bottom portions 52. Each of the flaps 58 is provided, starting on bottom 50, with a first portion 60 extending initially in parallel to the transverse frame portion 46 and flaring into an edge portion 62 bent towards the respective other flap 58. Thus, between each flap 58 and the associated transverse frame portion 46 there is formed a gap-like intermediate space 64. The width of this intermediate space 64 is defined by the distance of flap 58 to the transverse frame portion 46. When the filter element 12 is inserted in filter element holding frame 14, flaps 58 engage under two pleating portions 32 at the end portions 40 of filter medium 20 in the pleating direction 36 (see FIG. 1). With the filter element 12 inserted, the outermost pleating portions 32 are accommodated within said intermediate space 64.

While the stability of the zig-zag shape of filter medium 20 on the longitudinal sides thereof is improved by the stabilizing strips 34, the stability on the transverse sides (and portions 40) of filter medium 20 is improved by flaps 58. Some sort of positional fixing of filter element 12 in filter element holding frame 14 is effected in that, first, the sealing medium 42 while being slightly compressed—is in abutment with the longitudinal frame portions 44 from inside and, second, the pleating portions 32 at the end portions 40 of filter medium 20—these also being slightly compressed—are inserted in the above intermediate spaces 64. Accordingly, support of the filter element 12 and the pleated zig-zag configuration of filter medium 20 within filter element holding frame 14 is obtained by friction.

Figure 3:
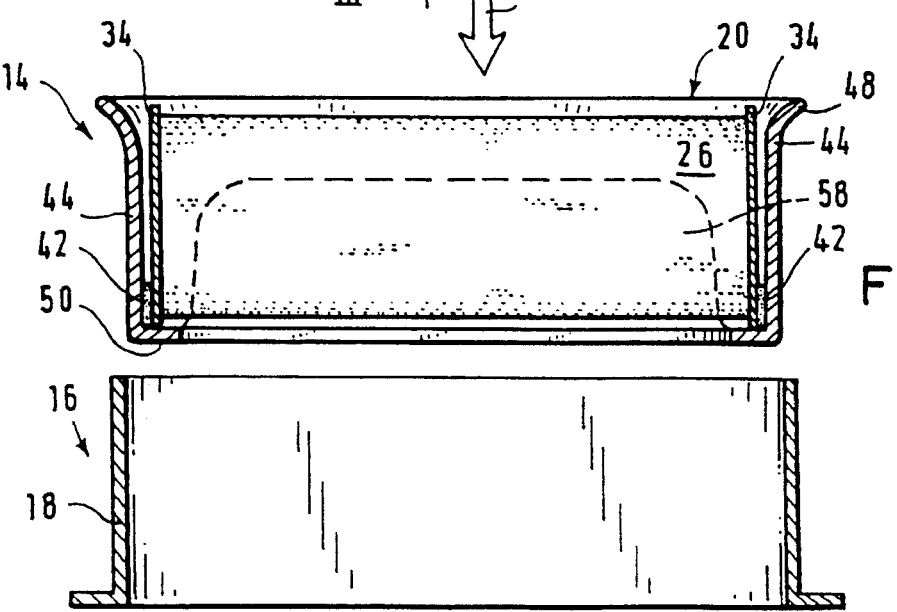
FIG. 3 is a cross-sectional view of the filter device according to FIG. 1, showing the filter element inserted into the holding frame, as seen along the line III—III of FIG. 2.

The opening of filter element holding frame 14 at the upper edge 48 thereof is slightly widened (see especially FIGS. 2 and 3) facilitating insertion of filter element 12 into holding frame 14. Because of the bent upper ends 62 of flaps 58, insertion of pleating portions 32 of end portions 40 of filter medium 20 into intermediate spaces 64 is also facilitated. The intermediate spaces 64 together with the flaps 58 act as receiving means 66 for receiving the portions 40 of filter medium 20 and holding portions 40 in place.

Also filter element holding frame 14, as is the case for filter element 12, consists of polypropylene.

The filter element 12 is the only disposable component of filter device 10. Since the filter element 12 (besides the material for filter medium 20) requires little additional material for stabilizing the zig-zag configuration of filter medium 20, the quantity of waste material in minimized. During use of the filter device, filter element 12 obtains additional required stability by the filter element holding frame 14.

EXAMPLE

It is highly advantageous if the above described filter device 10 is arranged in the manner described hereunder and is made from the parts and materials indicated hereunder. As a material for the reticular support structure 22, there are selected fibers of polypropylene having a diameter of about 0.45 mm. The openings of the reticular support structure 22 are diamond-shaped and their size is about 3.6 mm ×4.1 mm. The reticular support structure 22 has a thickness (height) of 0.85 mm. For the filter medium 20 and the sealing medium 42, electret materials are selected. The first, relatively loose non-woven filter layer 24 of filter medium 20 comprises split fibers having a cross-section of 10 to 40 μm. The basis weight of this non-woven material is about 58 g/m$^2$. The non-woven material comprises fibers which are connected to each other and are randomly distributed. The first, relatively loose non-woven filter layer 24 has a thickness of about 0.2 mm. The fibers are made from polypropylene with electret characteristics which are given to the fibers by methods known to the expert. The connection between the electret filter layer 24 and the reticular support structure 22 is obtained by bonding with a polypropylene adhesive. A filter material for the electret filter layer 24 is available, e.g., under the product name 3M Filtrete™, distributed by the firm Minnesota Mining and Manufacturing Company.

The non-woven material for the first filter layer 24 can also be provided as a non-woven structure made from circular fibers having a diameter of 1 to 5 μm and being obtained in a melt-blown process.

The second filter layer 26 acting as a cover layer comprises a spun-bonded non-woven material produced from multiply thermally bonded and randomly distributed fibers through known methods. The basis weight of this non-woven spun-bonded material is about 10–30 g/m$^2$ preferably 17 g/m$^2$. Connection between the cover layer and the electret filter layer 24 is effected by known adhesives compatible with polypropylene. As materials for the fibers of the cover layer, polyester, polyamide and preferably polypropylene are suitable. The thickness of the cover layer is preferably 0.22 mm. Polyester and polyamide are also suitable as materials for the fibers of filter layer 24.

A combination of the first non-woven filter layer 24 and the second non-woven filter layer 26, used as a cover layer is distributed under the product name SBMF by the firm Minnesota Mining and Manufacturing Company. The above-described combined arrangement of the reticular support structure, and the first and second filter layers is useful for the production of filter media, arranged in zig-zag pleats, which, with an overall size of 100×300 mm, have a pleating portion length of 25 mm and a folding, i.e., a distance from one bending region to another, of about 0.8–1.5 cm, preferably 1.0 cm. Thus, a V-shaped area of the zigzag shaped filter medium is preferably 1.0 cm wide at the wider portion thereof facing away from the tip, with the length of the legs or the depth being about 25 mm.

Also the stabilizing strips 34 comprise polypropylene and have a thickness ranging from 0.2 to 0.3 mm. The material for the sealing medium 42 comprises the combined layered filter structure described above. While the width of the stabilizing strips 34 is somewhat larger than the height of the zig-zag shaped pleated structure of filter medium 20, i.e., is slightly larger than 25 mm, the width of the narrow strips of sealing medium 42 is e.g. 6 to 8 mm.

We claim:

1. A filter device for the filtration of gases and fluids comprising:

a filter element having two longitudinal sides and two transverse sides comprising a filter medium, pleated in a zig-zag manner in a pleating direction, and two thermoplastic stabilizing strips, wherein said filter medium, on said two longitudinal sides extending in the pleating direction, is provided with said stabilizing strips for stabilizing the zig-zag shaped pleated configuration of the filter medium, said stabilizing strips being bonded to two longitudinal edges of the filter medium along the entire longitudinal sides of the filter element, a filter element holding frame having longitudinal and transverse frame portions and top and bottom faces said top face being adapted for insertion of the filter element therein and for removal of the filter element therefrom, said filter element holding frame having receiving means for inserting therein and removing therefrom two end portions of the filter element filter medium at the filter element transverse sides, a sealing medium being arranged between the filter element and the filter element holding frame, wherein when the filter element is inserted in the filter element holding frame the sealing medium is in abutment with inner sides of said longitudinal frame portions of the filter element holding frame and the two end portions of the filter medium on the filter element transverse sides are inserted in said receiving means provided on said transverse frame portions of the filter element holding frame so that the filter element can be freely removed and disposed of without disposing of the filter element holding frame.

2. The filter device according to claim 1 wherein the filter element holding frame has at least partially inclined transverse and longitudinal frame portions for facilitating insertion of the filter element.

3. The filter device according to claim 1 wherein the transverse frame portions of the filter element holding frame are provided with flaps facing each other and being at least partially inclined, said flaps together with the transverse frame portions forming the receiving means for the end portions of the filter element.

4. The filter device according to claim 3 wherein the filter element filter medium comprises a plurality of pleating portions having bending portions arranged therebetween and two outermost pleating portions forming the end portions and that, when the filter element is inserted in the filter element holding frame, the flaps and said receiving means at least partially engage the two outermost pleating portions from below.

5. The filter device according to claim 4 wherein the flaps are arranged in such a manner that the end portions of the filter element can be pressed into the receiving means.

6. The filter device according to claim 5 wherein the filter medium comprises a reticular support structure having arranged thereon a filter layer of a nonwoven material, and that said filter layer in turn has arranged thereon a cover layer of a non-woven material of greater strength than the filter layer.

7. The filter device according to claim 6 wherein the sealing medium comprises at least one layer of a non-woven material.

8. The filter device according to claim 7 wherein the sealing medium is bonded to the strip of stabilizing material.

9. The filter device according to claim wherein the sealing medium is of a strip-shaped configuration and each of said strips has substantially the same length but narrower than the stabilizing strips.

10. The filter device according to claim 9 wherein the filter medium, the sealing medium, the strips of stabilizing material and a bonding agent for effecting the bonding connection of the strips of stabilizing material with the filter medium and the sealing medium comprise the same thermoplastic material.

11. The filter device according to claim 8 wherein the filter element holding frame is adapted for insertion into a holding means in a manner allowing replacement of the filter element holding frame.

12. The filter device according to claim 11 wherein the filter element holding frame is a one part frame.

13. The filter device according to claim 1 wherein each of the two stabilizing strips have inner and outer sides and on each of said stabilizing strip outer sides facing away from the filter medium is provided a sealing medium, wherein when the filter element is inserted in the filter element holding frame the sealing media on the stabilizing strips outer sides are in abutment with inner sides of said longitudinal frame portions of the filter element holding frame.

* * * * *